May 18, 1943.  E. FLOOD  2,319,672
TORPEDO TRAP
Filed Jan. 29, 1942  2 Sheets-Sheet 1
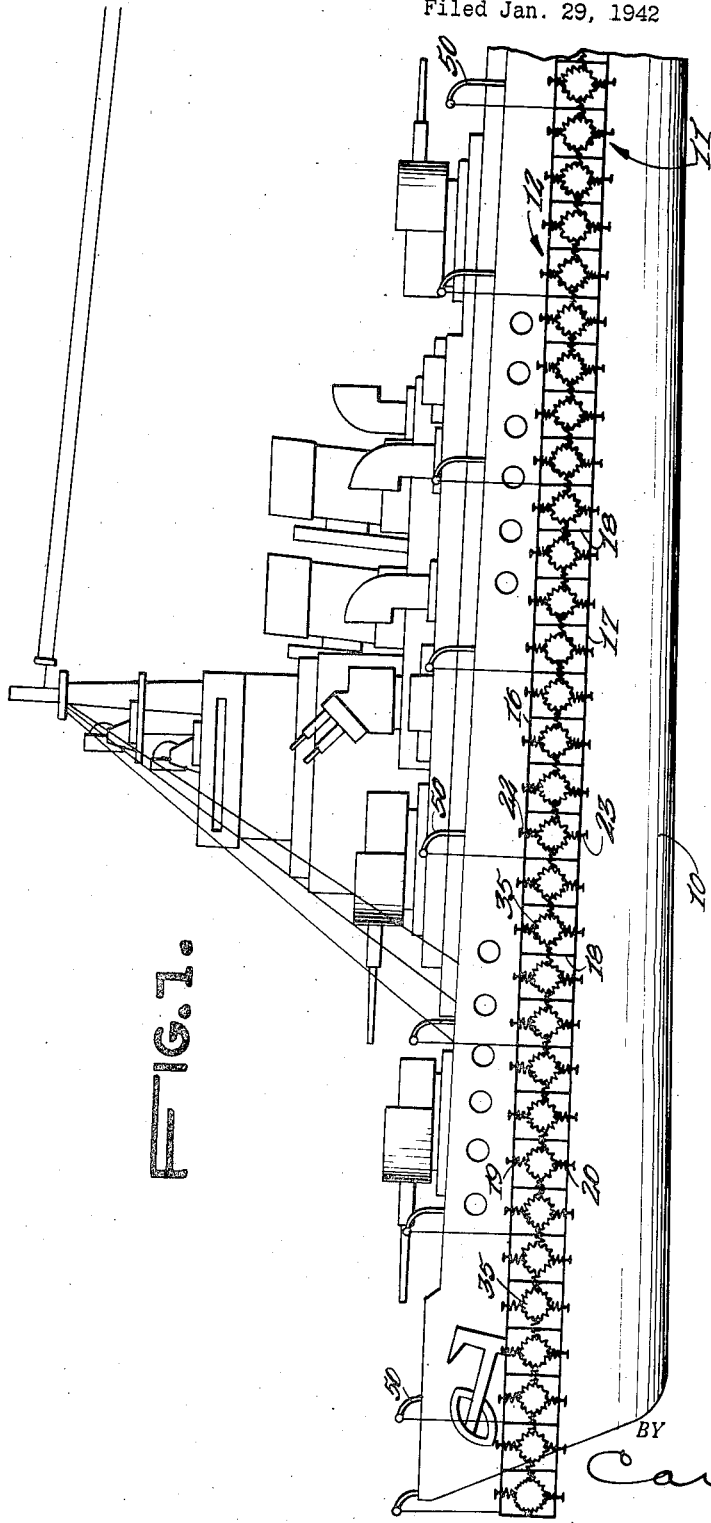
INVENTOR.
EDWARD FLOOD.
BY
Carl Miller
ATTORNEY.

May 18, 1943. E. FLOOD 2,319,672
TORPEDO TRAP
Filed Jan. 29, 1942 2 Sheets-Sheet 2
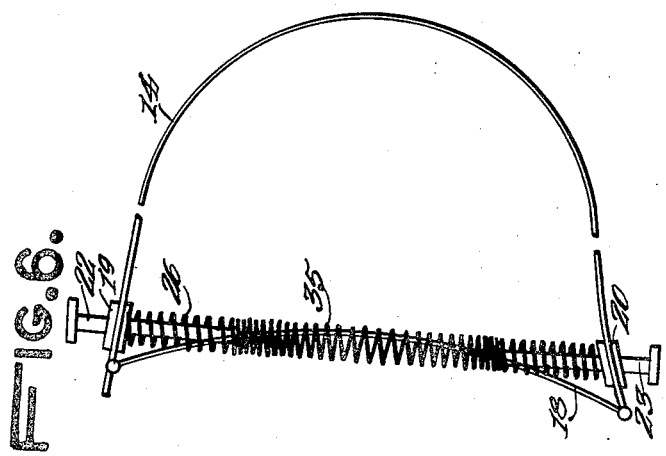
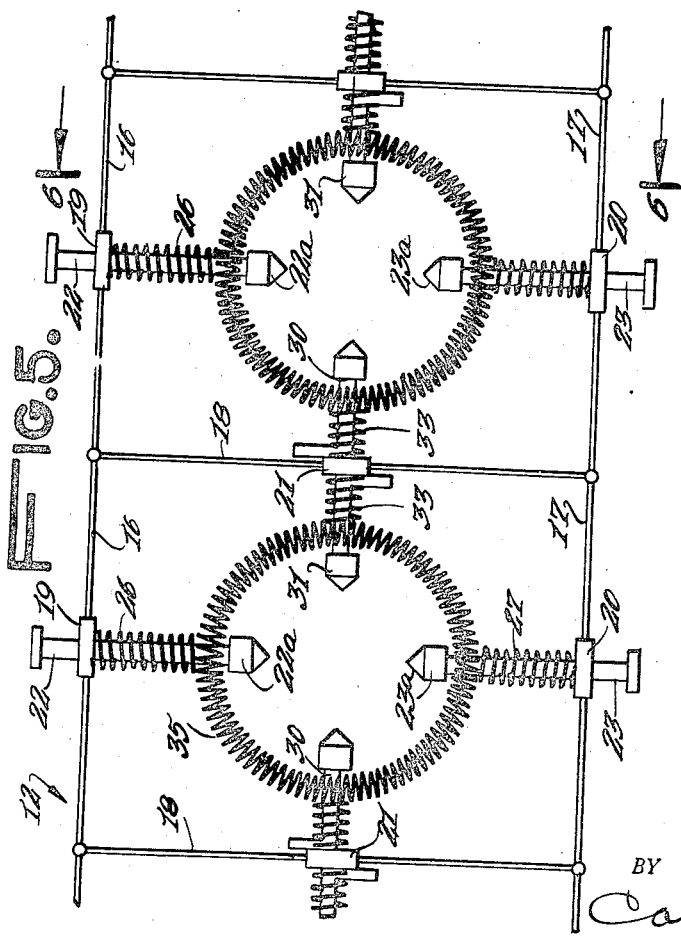
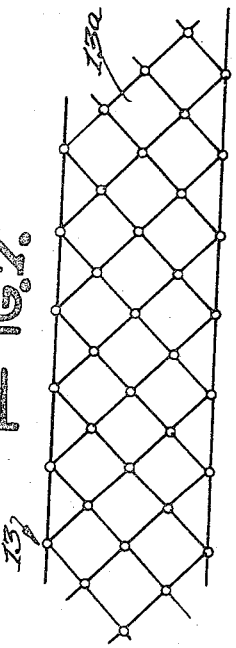
INVENTOR.
EDWARD FLOOD,
BY
Carl Miller
ATTORNEY.

Patented May 18, 1943

2,319,672

UNITED STATES PATENT OFFICE 2,319,672

TORPEDO TRAP

Edward Flood, New York, N. Y.

Application January 29, 1942, Serial No. 428,701

6 Claims. (Cl. 114—240)

This invention relates to torpedo traps for boats, such as private ships as well as war ships.

An object of this invention is to provide a torpedo trap which is suspended over the side of the boat, all around the boat, partly projecting below the level of the water, and partly above, to stop torpedoes from striking the boat.

A further object of this invention is to provide a strong and durable construction of the character described, which shall be relatively inexpensive to manufacture, and practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a side elevational view of a boat provided with a torpedo trap embodying the invention;

Figs. 2, 3 and 4 are diagrammatic views illustrating the method of suspending the torpedo trap in the water;

Fig. 5 is a front elevational view of a portion of the torpedo trap;

Fig. 6 is a cross-sectional view taken on line 6—6 of Fig. 5; and

Fig. 7 is a front elevational view of the rear net forming part of the torpedo trap.

Referring now in detail to the drawings, 10 designates a boat provided with a torpedo trap 11 embodying the invention. The torpedo trap extends all around the boat and is suspended on scaffolding or derricks or hoists of any suitable construction, such as illustrated for example in Figs. 2, 3, and 4 of the drawings.

The trap 11 comprises a front net 12 and a rear trap 13 interconnected by a plurality of U-shaped members 14. The front net 12 is supported by the forwardly extending arms of the U-shaped members 14. The rear trap 13 is supported by the rear or curved portions of the U-shaped members 14. The front trap 11 comprises top and bottom cables 16 and 17 interconnected by spaced vertical cables 18.

The top cable 16 supports a ring 19 between each pair of vertical cables 18. The lower cable 17 supports a ring 20 aligned with ring 19 between each adjacent pair of vertical cables 18.

On the middle of each vertical cable 18 is a ring 21. Slidably mounted within rings 19 and 20 are plungers 22 and 23, respectively, having pointed heads 22a and 23a at their inner ends. Interposed between the heads and the rings of plungers 22 and 23, are springs 26 and 27, respectively.

Extending through each of the rings 21, is a plunger 30 having outwardly pointed heads 31 at the outer ends thereof. Interposed between the ring 21 and the heads 31 are springs 33. The inner ends of the plungers 22, 23, 30, between each pair of vertical members 18, supports an annular coil spring 35.

The rear net 13, which is supported by the U-shaped members 14, is made of cables so interconnected as to provide a plurality of square shaped boxes 13a. The trap may be raised or lowered as conditions warrant. Part should be submerged below the water, with part projecting above the water. When the nose of a torpedo passes through expansion spring 35, the spring closes around the torpedo tightly to grip the same. The spring and the plungers become engaged with the rudder or propeller of the torpedo, thus lessening its speed, and the rear net also serves to stop the torpedo. The trap is preferably supported about 15 or 25 feet away from the side of the boat.

In Fig. 2, the torpedo trap 11 is supported on a hoist 40, from which there extends front and rear ropes 41 and 42 attached to front and rear portions of the trap.

In Fig. 3 the hoist 45 on the boat has a single suspended rope 46, through which forwardly and rearwardly inclined ropes 47 and 48 extend, the latter being attached to front and rear portions of the trap.

In Fig. 4, the trap is suspended by the usual hoist 50 for the lifeboats.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A torpedo trap comprising a plurality of parallel aligned, U-shaped members disposed in vertical planes and having horizontal arms, nets supported by the rear curved portions of said U-shaped members, top and bottom parallel cables interconnected to the ends of the arms of said U-shaped members, vertical members interconnecting the top and bottom arms of the U-shaped members, vertical plungers slidably mounted on said top and bottom cables between said U-shaped members, and horizontal plungers on said vertical members.

2. A torpedo trap comprising a plurality of parallel aligned, U-shaped members disposed in vertical planes and having horizontal arms, nets supported by the curved portions of said U-shaped members, top and bottom parallel cables interconnected to the ends of the arms of said U-shaped members, vertical members interconnecting the top and bottom arms of the U-shaped members, vertical plungers slidably mounted on said top and bottom cables between said U-shaped members and horizontal plungers on said vertical members, and springs for moving the plungers.

3. A torpedo trap comprising a pair of parallel, horizontal members, a pair of vertical members interconnecting said horizontal members, vertical plungers on said horizontal members, horizontal plungers on said vertical members, and springs on said plungers to move the same radially inwardly, said plungers being disposed radially of a common point.

4. A torpedo trap comprising a pair of parallel, horizontal members, a pair of vertical members interconnecting said horizontal members, vertical plungers on said horizontal members, horizontal plungers on said vertical members, and springs on said plungers to move the same radially inwardly, said plungers being disposed radially of a common point, said plungers having pointed heads at the inner ends thereof.

5. A torpedo trap comprising a pair of parallel, horizontal members, a pair of vertical members interconnecting said horizontal members, vertical plungers on said horizontal members, horizontal plungers on said vertical members, springs on said plungers to move the same radially inwardly, said plungers having pointed heads at the inner ends thereof, and an annular ring made of coil spring wire supported by said plungers.

6. A torpedo trap comprising a pair of parallel, horizontal members, a pair of vertical members interconnecting said horizontal members, vertical plungers on said horizontal members, horizontal plungers on said vertical members, springs on said plungers to move the same radially inwardly, said plungers having pointed heads at the inner ends thereof, an annular ring made of coil spring wire supported by said plungers, and a net disposed in back of said annular ring and connected to said horizontal members.

EDWARD FLOOD.